UNITED STATES PATENT OFFICE.

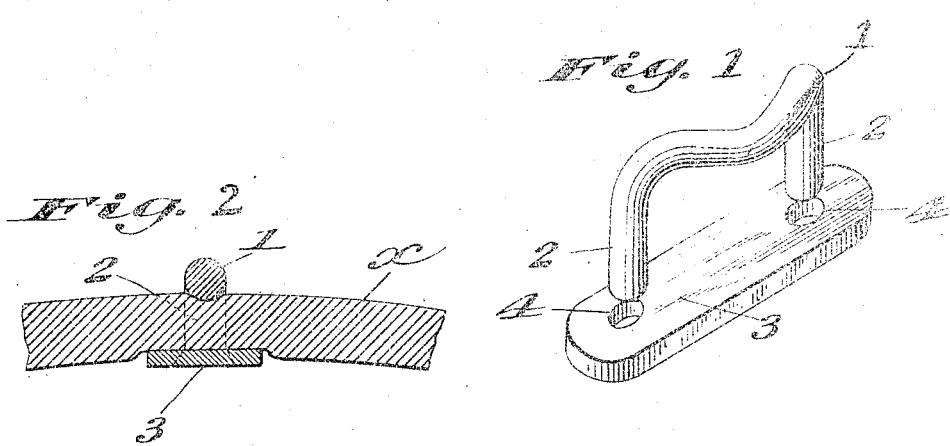

EDWIN BALL STIMPSON, OF NEW YORK, N. Y., ASSIGNOR TO EDWIN B. STIMPSON COMPANY, A CORPORATION OF NEW YORK.

ANTISKIDDING DEVICE.

945,057.     Specification of Letters Patent.     Patented Jan. 4, 1910.

Application filed December 5, 1906. Serial No. 346,501.

*To all whom it may concern:*

Be it known that I, EDWIN BALL STIMPSON, a citizen of the United States, residing in the borough of Brooklyn, city and State of New York, have invented a certain new and useful Antiskidding Device, of which the following is a specification.

My present invention relates to a new antiskidding device for use in connection with the tires of automobiles and other vehicles.

In the drawings, Figure 1 is a perspective view of the device, showing its two parts unassembled, and Fig. 2 is a transverse section of the device positioned on the tire.

Describing now my invention with particular reference to the drawing, and reserving it to the claim to point out the novel features and to define the scope of the invention, the anti-skidding device shown comprises two parts, a bent rod 1 and a base plate 3. The bent rod 1 has downwardly extending shanks 2 at either end positioned to be received through openings 4 in the base plate. The intermediate portion connecting the shanks 2 of the bent rod is not straight but is bent, or crooked, laterally in a plane substantially parallel with the plane of the base plate when the two parts of the device are assembled.

To use the device, the shanks 2 of the bent rod are inserted through suitable openings made in the tire with the crooked connecting portion of the rod resting upon the outside of the tire *x* in road-contacting position. The base plate is then applied to the underside of the tire material with the free ends of the shanks 2 received into the openings 4 in the base plate, and being clenched to hold the two parts of the device inseparably together.

It will be noted that preferably the road-contacting part of the device is made of round rod material whereby no sharp edges or corners are presented by it to the tire material to cut the tire.

The fact that the connecting, or intermediate, portion between the shanks 2 of the bent rod member is bent laterally out of a straight line, is to give the effect of clamping the tire material between two extended surfaces so that rocking of the device on the tire during its running is reduced to a minimum, and consequently the tire material is saved from frictional wear and abrasion to the same extent. In addition, the laterally bent road-contacting part has improved gripping quality both for the forward drive and as better tending to prevent skidding.

It will be understood that tires are to be equipped with a plurality of devices like that described extending all around the tread of the tire.

Having thus described my invention, what I claim is:

An anti-skidding device comprising a metal strip having its ends bent to pass through the tire material with its intermediate portion next the outside of said material, said portion being bent laterally out of a straight line; and a base plate having openings adapted to receive therethrough the extremities of the bent ends of the strip, said extremities being adapted to be clenched against the underside of the plate.

In witness whereof I have hereunto signed my name this 4th day of Dec. 1906, in the presence of two subscribing witnesses.

EDWIN BALL STIMPSON.

Witnesses:
WILLIAM J. FIRTH,
H. G. HOSE.